Patented Nov. 16, 1937

2,099,318

UNITED STATES PATENT OFFICE 2,099,318

PROCESS OF PREPARING RUBBER CONVERSION PRODUCTS

Lorin B. Sebrell, Silver Lake, Ohio, assignor to Wingfoot Corporation, Wilmington, Del., a corporation of Delaware No Drawing. Application January 30, 1933, Serial No. 654,248. Renewed April 3, 1937

8 Claims. (Cl. 260—1)

This invention relates to the manufacture of rubber conversion products. More particularly, it relates to an improved process of preparing rubber conversion products by the treatment of rubber and rubber-like substances with such agents as halogen acids of tin and halides of amphoteric metals. It relates especially to a process of preparation by which the desired rubber conversion products are obtained in form suitable for use in coating compositions, molded products, adhesives, etc. Among other things, the process of the present invention gives rise to a product in a fine state of subdivision enabling its ready use for the purposes mentioned.

It is known that halogen acids of tin and halides of amphoteric metals may be employed to convert rubber from its original state to a product which possesses quite different properties. In United States Patent 1,797,188, granted March 17, 1931, on an application filed by Herman A. Bruson, a conversion process employing chlorostannic acid and other halogen acids of tin is disclosed. That process involves, among other things, dispersing chlorostannic acid in rubber by milling the same into the rubber upon ordinary mill rollers or by incorporating the chlorostannic acid in a rubber cement. Thereafter, the mass is subjected to a temperature of between 130 and 150 degrees C. for a period of from 2 to 5 hours, following which the reaction product is sheeted out on a mill.

Similarly, in Patent 1,846,247, granted February 23, 1932, on an application filed by Herman A. Bruson, the treatment of rubber to form conversion products thereof by the employment of halides of amphoteric metals is described and claimed. That patent discloses the reaction of the rubber, whether in solid or solution form, with the halide of an amphoteric metal, preferably tin tetrachloride. It mentions the obtaining of the purified reaction product by the employment of acetone, alcohol or water as a separation agent. The employment of alcohol as such a separation agent is described in detail.

One of the objects of the present invention is to provide an improved process for preparing rubber conversion products of the kind disclosed by Bruson. Another is to provide a rubber conversion product in a form more convenient for handling in subsequent operations.

A further object is to provide a conversion product suitable for use in coating compositions, molded products and adhesives for uniting rubber to metal. Other objects and advantages will become apparent as the description of the invention proceeds.

The invention resides in the discovery that by reacting a liquid dispersion of rubber with a halogen acid of tin or a halide of an amphoteric metal at superatmospheric temperatures, quenching the resulting reacted cement in a relatively large volume of water preferably maintained in a state of agitation, and distilling off the solvent employed in dispersing the rubber, a conversion product in finely divided form may be quickly and efficiently obtained. Also, the process is one which easily permits extremely uniform properties for conversion products obtained in consecutive operations.

In general, the process involves the steps of first dissolving rubber, preferably milled pale crepe rubber, in benzene or other rubber solvent. One concentration found to be suitable is that in which the rubber approximates 10% by weight. To this cement is added the conversion agent, after which the mass is heated to approximately the boiling point of the solvent for a period of usually from 2½ to 7 hours or longer. When the viscosity of the reacted cement has reached a desired point, the reaction may be stopped by the addition of an alkali such as ammonium hydroxide and sodium hydroxide, or by the dilution of the acid with water.

As a general rule, it may be said that the longer the reaction of the materials, the harder and the more brittle the conversion product will be. Also, the longer the reaction, the less the viscosity of the reacted cement. Generally, if the product is to be used in coating compositions or molded goods, it is desirable to stop the reaction somewhat short of completion. In the case of the preparation of adhesives, it is preferable to stop the reaction even sooner.

At this point, the reacted cement may be cooled, filtered and quenched in a large volume of water or added directly to the water without cooling and filtering. It will generally be found preferable, however, to cool and filter the reacted cement because of foaming during the quenching process which tends to occur if the batch is hot. In case it is desired to have an unoxidized product such as is generally desired in a coating composition, it will also be found desirable to add to the quenching water a small amount of sodium sulfite, ammonium sulfite, or other reducing agent.

According to the handling during this quenching process, the final product may be obtained in a particle size varying from an extremely fine, powder-like material to a substance of pebble size or larger. It has been found that the particle size is determined by several variables. One is the ratio of the quenching water to the reacted cement, it being found that the less the water, the larger the particle size. Another factor important to the proper practice of the invention, more particularly in obtaining a product of finely divided particle size, is the agitation of the mass. In general, the less the agitation, the larger the particle size. Also, it will be found that in general the faster the distillation of the solvent, the larger will be the particle size.

After the distillation off of substantially all of the solvent, the rubber conversion product precipitates from the agitated mass in a particle size varying according to the conditions employed. The product may then be washed and dried in any convenient manner such as by centrifuging and drying under vacuum. The conversion product as so obtained is substantially pure and in a form convenient for handling in the subsequent operations without the necessity of grinding etc. The solvent employed may be recovered almost in toto and the entire process may be carried out in only a few hours.

Although tin tetrachloride has been found to give excellent results, other halide salts of amphoteric metals such as the bromides and iodides of tin, the tetra-halides of titanium, the trichlorides, bromides and iodides of iron and cobalt, the halides of aluminum and the tri- and pentachlorides and bromides of antimony or arsenic may be employed with highly satisfactory results. Similarly, where it is desired to employ a halogen acid of tin, anhydrous or hydrated chlorostannic acid will generally be found to be preferable. Others, such as chlorostannous acid, fluorostannic acid, bromostannous and bromostannic acids, may, however, be successfully employed in the practice of the invention.

Although the amounts of conversion agent employed may be varied within fairly wide limits, the optimum quantity is best arrived at by experimentation. For instance, when employing tin tetrachloride or chlorostannic acid, amounts varying from three to twenty per cent of the weight of rubber employed may be used satisfactorily. With tin tetrachloride, however, amounts approximating five per cent give unusually good results, while with chlorostannic acid amounts in the neighborhood of ten per cent are in general to be preferred.

Illustrative of the preparation of a rubber conversion product from rubber and tin tetrachloride suitable for use as an adhesive is the case in which 1340 grams of a rubber cement prepared by dissolving approximately 20 parts by weight of plasticized crude rubber in 100 parts by weight of benzene are first diluted with 900 cc. of anhydrous benzene. In an adhesive it is frequently found that a rubber plasticizer such as thin pine tar or a half-and-half mixture of thin pine tar and pine resin is desirable. Accordingly, thin pine tar equivalent in weight to 5.3 per cent of the rubber in the cement is dispersed in 100 cc. of anhydrous benzene and added to the cement. Thereafter, a 5 cc. portion of anhydrous tin tetrachloride, which is equal in weight to approximately 4.25 per cent of the rubber is admixed with 200 cc. of benzene and added to the diluted cement. The latter is stirred at room temperature for a period of 25 minutes.

The vessel containing the solution is then immersed in a water bath heated to a temperature of approximately 45 degrees C. and the temperature gradually increased to approximately 90 degrees C. during a period of about 25 minutes. The heating is continued for a period of two hours after which the product is poured into warm water, stirred vigorously, and boiled for a period of about 14 minutes in order to remove the rubber solvents and to hydrolyze the tin chloride, thereby rendering it inactive. Of course, if desired, an alkali such as sodium hydroxide may be employed to stop the reaction prior to pouring the product into the water.

This treatment causes the product to be precipitated as a fine sand-like material which, after being further washed to remove any solvents and tin chloride and after drying in the air, is obtained in the form of a gray, fluffy granular material.

For adhesives it is frequently desirable to add an antioxidant or age retarder and, with it, still more of a plasticizer or softener such as the thin pine tar employed above. This may be accomplished by mixing the powder upon mill rollers heated to a temperature of 130 degrees F. for a period of 12 minutes during which 3% of phenyl beta naphthylamine or other antioxidant and thin pine tar are added in order to increase the age-resisting and plasticizing properties of the product. The final product is a tough balata-like mass which may be dissolved in benzene, gasoline or other rubber solvent.

The steps involved in the process described may be varied within wide limits, although the quenching of the reacted cement in water and the distillation of the solvent are regarded as of great importance to the success of the process. Thus, the mixture of rubber cement and tin tetrachloride may be allowed to react at room temperatures or it may be heated at once to the neighborhood of the boiling point of the solvent and there reacted until the suitable viscosity of the cement is obtained. For conversion products used in coating compositions and molded products, it will generally be found desirable to react the materials in the neighborhood of the boiling point of the solvent.

Another feature capable of variation is the rate of agitation of the quenching water. Although for most purposes it is desirable to maintain a fairly vigorous agitation of the water during the whole of the quenching step, in some instances vigorous agitation is preferably not employed. To illustrate, 1340 grams of a rubber cement prepared as disclosed above are diluted with 900 cc. of anhydrous benzene to which a half-and-half mixture of thin pine tar and pine resin, equivalent in weight to 5.3 per cent of the rubber in the cement, dispersed in 100 cc. of anhydrous benzene, is added to the cement. A 7 cc. portion of anhydrous tin tetrachloride, equivalent in weight to 5.7 per cent of the rubber, is mixed with 200 cc. of benzene and added to the cement, whereupon the latter is stirred at room temperature for a period of 35 minutes.

The vessel containing the solution is then immersed in a water bath heated to a temperature of approximately 45° C. and the temperature is gradually increased to 90° C. during a period of about 25 minutes. The heating is continued for an hour and thirty minutes longer, after which the product is poured into warm water and boiled for a period of about 14 minutes in order to remove the rubber solvents and to hydrolize the tin chloride, thereby rendering it inactive. Instead of precipitating in a fine sand-like form, the product is obtained as a spongy, porous mass suitable for use in the preparation of adhesives, which is washed further to remove any solvents and unreacted tin chloride and is then permitted to dry in the air.

The dried product is obtained in the form of a gray, fluffy powder that can be reduced to a tough balata-like mass by milling it upon rollers heated to a temperature of 130° F. for a period of 12 minutes, during which 3% of phenyl beta naphthylamine and 5% of thin pine tar are added. The final product is extremely tough and plastic and may be readily dispersed in benzene, carbon tetrachloride and other rubber solvents.

Illustrative of the preferred process of preparing a conversion product adapted for use in a coating composition or molded product is the following: A rubber cement is prepared by dissolving in benzene 10 per cent by weight of pale crepe rubber which has been plasticized to a condition such that a $\frac{9}{16}$ cubic inch sample thereof when placed on a flat plate beneath a flat ten kilogram weight for $3\frac{1}{2}$ minutes in a cabinet heated to a temperature of 70° C. is flattened out to a thickness slightly less than $\frac{1}{8}$ inch. The instrument for this test is familiarly known in the art as the Williams plastometer. Although unvulcanized rubber of any plasticity value may be employed, and although it is recognized that rubber having a certain plasticity figure gives a conversion product better adapted to some uses than to others, it has been found that the rubber prepared as described above is generally satisfactory for use in a number of products.

350 gallons of the cement so prepared are placed in a steam-jacketed Day mixer containing a reflux condenser, or similar apparatus, whereupon approximately 10 per cent (based on the weight of the rubber in the cement) of hydrated chlorostannic acid ($H_2SnCl_6.6H_2O$) is added. The chlorostannic acid may be conveniently prepared by adding sufficient aqueous hydrochloric acid to tin tetrachloride to give the water for the hydrate and then saturating with hydrogen chloride gas at room temperature. The mixture is heated and agitated for a period of 3 hours at temperatures between 65 and 80 degrees C. but in any event near the boiling point of the solvent. Samples are then taken every few minutes and the viscosities thereof determined by suitable means. Usually the desired viscosity is obtained after a reaction period of about six hours although this figure varies somewhat from batch to batch.

Any viscosity instrument may be used, one such being a Gardner mobilometer, an instrument measuring the viscosity of a sample in terms of the time in minutes required for a plunger of known weight and area to fall a known distance in a cylinder of known volume containing the test sample. The clearance between the plunger and the wall of the cylinder is also known. It is also preferable to take all readings at one temperature, 25° C. being selected as suitable in the examples described. The mobilometer used had the following dimensions:

| | |
|---|---|
| Thickness of plunger disk | 0.066 inches |
| Diameter of plunger disk | 1.502 inches |
| Diameter of plunger shaft | 0.248 inches |
| Inside diameter of cylinder containing test sample | 1.535 inches |
| Height of cylinder | 9.0 inches |
| Length of plunger shaft | 20.0 inches |
| Distance between the two marks on plunger shaft | 7.484 inches |
| Total weight of shaft, top weight and disk | 68.6 grams |

When the viscosity of the cement reaches a point about .05–.07 minute above the desired final viscosity, which in the case of a conversion product for use in a coating composition is $0.30\pm.10$ minute and for use in a molded article is $0.20\pm.10$ minute, the reaction is preferably stopped by the addition of 40 grams of NaOH dissolved in water per pound of chlorostannic acid used in the reaction or by the addition of one pint of water per pound of chlorostannic acid used. The batch is then cooled and filtered, after which the reacted cement in the ratio of 350 gallons of cement to 450 gallons of water is charged into water at ordinary room temperature and agitated by an impeller rotating at approximately 240 R. P. M. In case the final product is to be employed in a coating composition, it is desirable to add $\frac{3}{4}$ of an ounce of sodium sulfite per gallon of water prior to the addition of the reacted cement for the purpose of preventing oxidation of the product.

Thereupon steam is introduced into the water-cement mixture at such a rate that the vapor temperature in an ordinary column extending from the reactor to a condenser reaches 154 degrees F. in 40 minutes. During the next thirty minutes the temperature is maintained at 154 degrees F., during which interval the majority of the solvent distills over into a condenser. The temperature is then increased to 210 degrees F. in the next 50 minutes and permitted to remain there for another 25 minutes, during which practically all of the remainder of the solvent distills off. The chlorostannic acid conversion product of rubber precipitates in a finely divided, sand-like form and may then be centrifuged, washed with water and dried in a vacuum oven.

In another instance 25 pounds of rubber-chlorostannic acid cement reacted as above are charged into 28 gallons of water agitated by an impeller or other suitable means. The container is closed and steam is introduced at such a rate that the temperature of the mass reaches 150° F. in ten minutes. During the next ten minutes the temperature is raised to 160° F. and in five minutes more to 200–210° F., where it is permitted to remain for five minutes. The rubber conversion product precipitates in a finely divided, sand-like form and may be washed in any convenient manner.

If a somewhat coarser product is desired, it may be obtained easily by increasing the rate of distillation. Thus, in another case of a 25-pound batch of reacted cement in 28 gallons of water, the temperature is allowed to rise to 145 degrees in 10 minutes, followed by a short period of heating at 200–210 degrees. The product precipitates in a size approximating that of small pebbles.

It is evident that a highly efficient process is provided. Practically all of the benzene employed may be recovered by known means and used in subsequent operations. The quenching medium required is ordinary water and the time required for the entire process is only a few hours. The product is in substantially pure form and in a form convenient for handling. Further, the steps of the process are so arranged that consecutive batches of conversion product of practically identical properties can be easily obtained.

The conversion product itself is transparent and in thin films practically colorless, although, if desired, pigments which are not acted upon by hydrochloric acid or chlorostannic acid may be incorporated in the rubber cement prior to the preparation of the conversion product. Generally this will not be preferred to mixing the conversion product with the pigments later, because of the fact that the pigments sometimes slow up the reaction and require greater care in cleaning the apparatus for subsequent batches. Being practically colorless, the rubber conversion product may be used in products of any desired color. Being essentially neutral, it is compatible with all pigments and dyes and in this respect differs materially from many materials now on the market. It is also quite light in weight, having a specific gravity of 1.05.

It is obvious that numerous changes both in the conditions of the process and the amounts of the reacting materials may be made without departing from the spirit of the invention. It is intended that the patent shall cover, by suitable expression in the appended claims, whatever features of patentable novelty reside in the invention.

What I claim is:

1. A method of treating rubber which comprises dissolving it in an inert solvent, adding tin tetrachloride to the resulting cement, permitting the mixture to react at room temperature to form an addition product, splitting tin from the addition product under reducing conditions and drying in the absence of air.

2. A method of treating a rubber cement which comprises introducing a halide salt of an amphoteric metal into dissolved rubber, permitting the materials to react at room temperature, splitting the amphoteric metal from the addition product under reducing conditions and drying in the substantial absence of air.

3. A method of treating rubber which comprises dissolving it in an inert solvent, heating the resulting cement, introducing therein a halide of an amphoteric metal and permitting the rubber of the cement and the halide to interact, splitting the amphoteric metal from the reaction product under reducing conditions and drying in the substantial absence of air.

4. A process of preparing a finely divided conversion product of rubber which comprises reacting at superatmospheric temperature an approximately ten per cent solution of plasticized rubber in benzene and tin tetrachloride in an amount equivalent to approximately five per cent of the rubber, adding the resulting reacted cement to cold water containing a reducing agent and distilling off the benzene.

5. A process of treating rubber which comprises reacting an approximately ten per cent solution of plasticized pale crepe rubber in benzene with approximately ten per cent of hydrated chlorostannic acid based on the rubber content, at a temperature ranging from 65 to 80 degrees C. for a period of from 3 to 7 hours, quenching the reacted cement in agitated cold water and heating the mass to a temperature sufficient to evaporate substantially all the benzene.

6. In the process of preparing a finely divided conversion product of rubber reacted with a material selected from the group consisting of a halogen acid of tin and halide of an amphoteric metal by reacting a solution of the rubber with said material and then pouring the reaction mixture into water and a reducing agent, the step after pouring the reaction mixture into water of rapidly distilling off the solvent to produce a finely divided product.

7. A method of treating rubber which comprises causing a halide of an amphoteric metal to react on rubber in solution in a solvent immiscible with water, obtaining therefrom a solution of a condensation derivative of rubber in said solvent, removing the solvent by distillation in the presence of water, separating the condensation derivative from the water and drying the condensation derivative at an elevated temperature in a vacuum.

8. A method of treating rubber which comprises causing chlorostannic acid to react on rubber in solution in a solvent immiscible with water, obtaining therefrom a solution of a condensation derivative of rubber in said solvent, removing the solvent by distillation in the presence of water, separating the condensation derivative from the water and drying the condensation derivative at an elevated temperature in a vacuum.

LORIN B. SEBRELL.